United States Patent
Zhou et al.

(10) Patent No.: US 12,107,798 B2
(45) Date of Patent: Oct. 1, 2024

(54) METHOD FOR CONTROLLING A BWP INACTIVITY TIMER AND TERMINAL DEVICE

(71) Applicant: VIVO MOBILE COMMUNICATION CO., LTD., Guangdong (CN)

(72) Inventors: Jianping Zhou, Dongguan (CN); Xiaodong Yang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 808 days.

(21) Appl. No.: 17/129,056

(22) Filed: Dec. 21, 2020

(65) Prior Publication Data

US 2021/0111857 A1    Apr. 15, 2021

Related U.S. Application Data

(63) Continuation of application No. PCT/CN2019/089383, filed on May 30, 2019.

(30) Foreign Application Priority Data

Jun. 22, 2018    (CN) .......................... 201810654990.9

(51) Int. Cl.
| | |
|---|---|
| *H04W 4/00* | (2018.01) |
| *H04L 5/00* | (2006.01) |
| *H04W 72/0453* | (2023.01) |
| *H04W 72/23* | (2023.01) |
| *H04W 74/0833* | (2024.01) |
| *H04W 76/11* | (2018.01) |

(52) U.S. Cl.
CPC .......... *H04L 5/0098* (2013.01); *H04L 5/0092* (2013.01); *H04W 72/0453* (2013.01);
(Continued)

(58) Field of Classification Search
CPC . H04W 74/0833; H04W 76/11; H04W 72/04; H04W 72/12; H04W 72/50; H04L 5/0098; H04J 2203/0069
See application file for complete search history.

(56) References Cited

U.S. PATENT DOCUMENTS

| | | | |
|---|---|---|---|
| 2018/0124687 A1 | 5/2018 | Park et al. | |
| 2020/0059345 A1* | 2/2020 | Pelletier | ................ H04L 5/0087 |

(Continued)

FOREIGN PATENT DOCUMENTS

| | | |
|---|---|---|
| CN | 102264094 A | 11/2011 |
| CN | 102271415 A | 12/2011 |

(Continued)

OTHER PUBLICATIONS

Extended European Search Report regarding Application No. 19823419.7-1205 / 3799344 PCT/CN2019/089383, dated Jun. 7, 2021.
(Continued)

*Primary Examiner* — Shantell L Heiber
(74) *Attorney, Agent, or Firm* — Harness, Dickey & Pierce, P.L.C.

(57) ABSTRACT

Embodiments of the present disclosure provide a method for controlling a BWP inactivity timer and a terminal device. The method includes: controlling, in a case where there is at least one configured or activated BWP for the terminal device, a BWP inactivity timer of each BWP in the at least one configured or activated BWP according to a preset processing mode or a network configuration mode, the preset processing mode or the network configuration mode being to start the BWP inactivity timer, or restart the BWP inactivity timer, or not start the BWP inactivity timer, or stop the BWP inactivity timer.

20 Claims, 11 Drawing Sheets

(52) U.S. Cl.
CPC ....... *H04W 72/23* (2023.01); *H04W 74/0833* (2013.01); *H04W 76/11* (2018.02)

(56) References Cited

U.S. PATENT DOCUMENTS

| | | | |
|---|---|---|---|
| 2020/0221508 A1 | 7/2020 | Huang et al. | |
| 2020/0245360 A1* | 7/2020 | Xu | H04W 72/23 |
| 2021/0058218 A1* | 2/2021 | Harada | H04L 5/0098 |

FOREIGN PATENT DOCUMENTS

| | | |
|---|---|---|
| CN | 108012329 A | 5/2018 |
| EP | 2747331 A1 | 6/2014 |

OTHER PUBLICATIONS

"Clarification on the RACH re-initiation after BWP switching," vivo, 3GPP TSG-RAN WG2 Meeting #101bis, R2-1804690, dated Apr. 20, 2018.

"RA procedure and BWP-Inactivity Timer," CATT, 3GPP TSG-RAN WG2 NR Ad hoc 0118, R2-1800162, dated Jan. 26, 2018.

"Remaining issues for BWP inactivity timer," Huawei et al., 3GPP TSG-RAN2 Meeting #101 R2-1801816, Mar. 2, 2018.

"Correction to BWP inactivity timer," Huawei et al., 3GPP TSG-RAN2 Meeting #101bis R2-1804413, section 5.5, Apr. 16-20, 2018.

"Further consideration on BWP inactivity timer," CATT, 3GPP TSG-RAN WG2#101, Feb. 26-Mar. 2, 2018.

"Issues/Corrections for BWP Inactivity Timer Operation," Samsung, 3GPP TSG-RAN2 AH-1801, Jan. 22-26, 2018.

International Search Report and Written Opinion regarding International Application No. PCT/CN2019/089383, dated Aug. 30, 2019. Translation provided by Bohui Intellectual Property.

First Office Action regarding Chinese Patent Application No. 201810654990.9, dated May 14, 2020. Translation provided by Bohui Intellectual Property.

Second Office Action regarding Chinese Patent Application No. 201810654990.9, dated Aug. 10, 2020. Translation provided by Bohui Intellectual Property.

Third Office Action regarding Chinese Patent Application No. 201810654990.9, dated Nov. 2, 2020. Translation provided by Bohui Intellectual Property.

* cited by examiner

METHOD FOR CONTROLLING A BWP INACTIVITY TIMER AND TERMINAL DEVICE

CROSS-REFERENCE TO RELATED APPLICATIONS

This application is a Bypass Continuation Application of PCT/CN2019/089383 filed on May 30, 2019, which claims priority to Chinese Patent Application No. 201810654990.9 filed on Jun. 22, 2018, the entirety of each is incorporated herein by reference.

TECHNICAL FIELD

The present disclosure relate to the field of communication technologies, and more particularly to a method for controlling a bandwidth part (BWP) inactivity timer and a terminal device.

BACKGROUND

In the fifth generation (5G) communication system, a cell supports a system bandwidth up to 400 MHz, which is much greater than a maximum system bandwidth of 20 MHz supported by the long term evolution (LTE) system, so as to support a larger system and greater user throughput.

SUMMARY

In a first aspect, some embodiments of the present disclosure provide a method for controlling a BWP inactivity timer, which is applied to a terminal device, and the method includes: in a case where there is at least one configured or activated bandwidth part (BWP) for the terminal device, controlling a BWP inactivity timer of each BWP in the at least one configured or activated BWP according to a preset processing mode or a network configuration mode; the preset processing mode or the network configuration mode is to start the BWP inactivity timer, or restart the BWP inactivity timer, or not start the BWP inactivity timer, or stop the BWP inactivity timer.

In a second aspect, some embodiments of the present disclosure provide a terminal device, including: a processor configured to control, in a case where there is at least one configured or activated bandwidth part (BWP) for the terminal device, a BWP inactivity timer of each BWP in the at least one configured or activated BWP according to a preset processing mode or a network configuration mode; the preset processing mode or the network configuration mode is to start the BWP inactivity timer, or restart the BWP inactivity timer, or not start the BWP inactivity timer, or stop the BWP inactivity timer.

In a third aspect, some embodiments of the present disclosure provide a non-transitory computer-readable storage medium. Computer programs are stored on the computer-readable storage medium. When executed by a processor, the computer programs implement the steps of the method for controlling the BWP inactivity timer as described in the first aspect or the second aspect.

DETAILED DESCRIPTION

Figure 1:
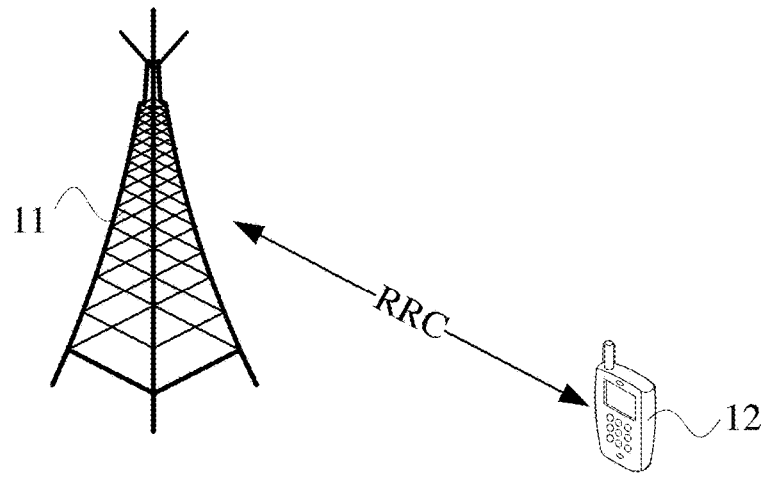
FIG. 1 is a schematic diagram showing a structure of a communication system involved in some embodiments of the present disclosure.

Technical solutions in embodiments of the present disclosure will be described clearly and completely with reference to accompanying drawings in the embodiments of the present disclosure. Obviously, the described embodiments are merely some but not all embodiments of the present disclosure. All other embodiments obtained on a basis of the embodiments of the present disclosure by a person of ordinary skill in the art without paying any creative effort shall be included in the protection scope of the present disclosure.

The term "and/or" herein is merely used to describe an association relationship of associated objects, which represents three types of relationships. For example, the phrase "A and/or B" represents three situations: A exists alone, both A and B exist, and B exists alone. In addition, the character "/" herein generally indicates that the associated objects are in an "or" relationship. The character "/" in a formula indicates that the associated objects are in a "division" relationship. The term "a plurality of/the plurality of" herein means two or more unless otherwise specified.

In order to clearly describe the technical solutions in the embodiments of the present disclosure, in the embodiments of the present disclosure, the terms such as "first" and "second" are used to distinguish the same or similar items whose functions and effects are substantially the same. A person skilled in the art will understand that the terms such as "first" and "second" are not intended to limit a quantity and an execution order of the items.

In the embodiments of the present disclosure, the words such as "for example" or "such as" are used to indicate examples, illustrations or explanations. Any embodiment or design solution described as "for example" or "such as" in the embodiments of the present disclosure should not be construed as being more preferable or advantageous than other embodiments or design solutions. To be precise, use of the words such as "for example" or "such as" is intended to present related concepts in a specific manner. In the embodiments of the present disclosure, the term "a plurality of/the plurality of" means two or more unless otherwise specified.

Since the system bandwidth of the 5G is large, if a terminal device supports an entire system bandwidth of the 5G system, a cost of the terminal device will be greatly increased. In order to support the access of narrowband terminal devices or terminal devices in an energy-saving mode, the 5G system supports dynamic and flexible bandwidth allocation, and the system bandwidth can be divided into a plurality of bandwidth parts (BWPs). In addition, the cell of the 5G system also supports different resource configurations (Numerologies) for different bandwidths. If a terminal device does not support all resource configuration types of the cell, a BWP with a corresponding frequency band may be prevented from being configured for the terminal device when BWPs are configured for the terminal device, thereby supporting the access of the narrowband terminal devices or the terminal devices in the energy-saving mode. A network-side device configures a BWP set available to each cell for the terminal device through radio resource control (RRC) signaling, and dynamically switches a BWP that needs to be activated through L1 signaling, that is, activating a BWP while deactivating another BWP. In addition, although the network-side device is configured with BWP inactivity timers, how the terminal device controls a BWP inactivity timer of each activated BWP is an urgent problem to be solved.

With the development of communication technologies, a scenario where a plurality of BWPs of the terminal device are simultaneously activated occurs. When the BWPs of the terminal device are activated simultaneously, how the terminal device controls the BWP inactivity timer of the activated BWP is an urgent problem to be solved.

On a basis of the above problem, some embodiments of the present disclosure provide a method for controlling a BWP inactivity timer and a terminal device. In the method for controlling a BWP inactivity timer, in a case where there is at least one configured or activated BWP for the terminal device, a BWP inactivity timer of each BWP in the at least one configured or activated BWP is controlled according to a preset processing mode or a network configuration mode. The preset processing mode or the network configuration mode is to start the BWP inactivity timer, or restart the BWP inactivity timer, or not start the BWP inactivity timer, or stop the BWP inactivity timer. Since some embodiments of the present disclosure provide a method for the terminal device to control BWP inactivity timer(s) of the at least one configured or activated BWP of the terminal device in a case where there is at least one configured or activated BWP for the terminal device, the BWP inactivity timer of the activated BWP of the terminal device may be controlled.

The technical solution provided by the present disclosure may be applied to various communication systems, such as a fifth generation (5G) communication system, a future evolution system or various unified communication systems. A plurality of application scenarios may be included, such as machine to machine (M2M), D2M, macro and micro communications, enhance mobile broadband (eMBB), ultra-reliable and low-latency communication (URLLC), and massive machine type communication (mMTC). These scenarios include, but are not limited to scenarios such as communication between a terminal device and a terminal device, or communication between a network-side device and a network-side device, or communication between a network-side device and a terminal device. Some embodiments of the present disclosure may be applied to communication between a network-side device and a terminal device, or communication between a terminal device and a terminal device, or communication between a network-side device and a network-side device in the 5G communication system.

FIG. 1 shows a schematic diagram of a possible structure of a communication system involved in some embodiments of the present disclosure. As shown in FIG. 1, the communication system may include a network-side device 11 (shown in FIG. 1 by taking an example in which the network-side device is a base station), and a terminal device 12 (shown in FIG. 1 by taking an example in which the terminal device is a mobile phone). The terminal device 12 may communicate with the network-side device 11 via a radio access network (RAN), and the terminal device 12 has at least one configured or activated BWP. The network-side device 11 generates at least one carrier wave, and each carrier wave corresponds to a cell.

The network-side device 11 may be a base station, a device in a core network, a transmission and reception point (TRP), a relay station, an access point, etc. The network-side device 11 may be a base transceiver station (BTS) in a global system for mobile communication (GSM) or a code division multiple access (CDMA) network, or may be a NodeB (NB) in wideband code division multiple access (WCDMA), or may be an evolutional NodeB (eNB or eNodeB) in the LTE. The network-side device 11 may also be a wireless controller in a cloud radio access network (C-RAN) scenario. The network side device 11 may also be a network-side device in the 5G communication system or a network-side device in a future evolution network.

The terminal device 12 may be a mobile terminal or a non-mobile terminal. The mobile terminal may be a device that provides users with voice and/or other service data connectivity, a handheld device with a wireless communication function, a computing device, or other processing devices connected to a wireless modem, a vehicle-mounted device, a wearable device, a terminal device in a future 5G network or a terminal device in a future evolved public land mobile network (PLMN). The mobile terminal may communicate with one or more core networks via the RAN. For example, the mobile terminal may be a mobile phone (or referred to as a "cellular" phone) or a computer with a mobile terminal. For example, the mobile terminal may be a portable, compact, handheld, built-in computer or vehicle-mounted mobile device which exchanges language and/or data with the RAN, and a personal communication service (PCS) phone, a cordless phone, a session initiation protocol (SIP) phone, a wireless local loop (WLL) station, a personal digital assistant (PDA) or any other device. A wireless terminal may also be a mobile device, a user equipment (UE), an access terminal, a wireless communication device, a terminal unit, a terminal station, a mobile station, a mobile, a remote station, a distant station, a remote terminal, a subscriber unit, a subscriber station, a user agent or a terminal device. As an example, in some embodiments of the present disclosure, FIG. 1 shows an example in which the terminal device is a mobile phone.

An execution subject of the method for controlling a BWP inactivity timer provided by some embodiments of the present disclosure may be the above terminal device (including the mobile terminal and the non-mobile terminal), or may be a functional module and/or a functional entity in the terminal device that can implement the method for controlling the BWP inactivity timer, which may be determined according to actual use requirements, and is not limited in some embodiments of the present disclosure.

Figure 2:
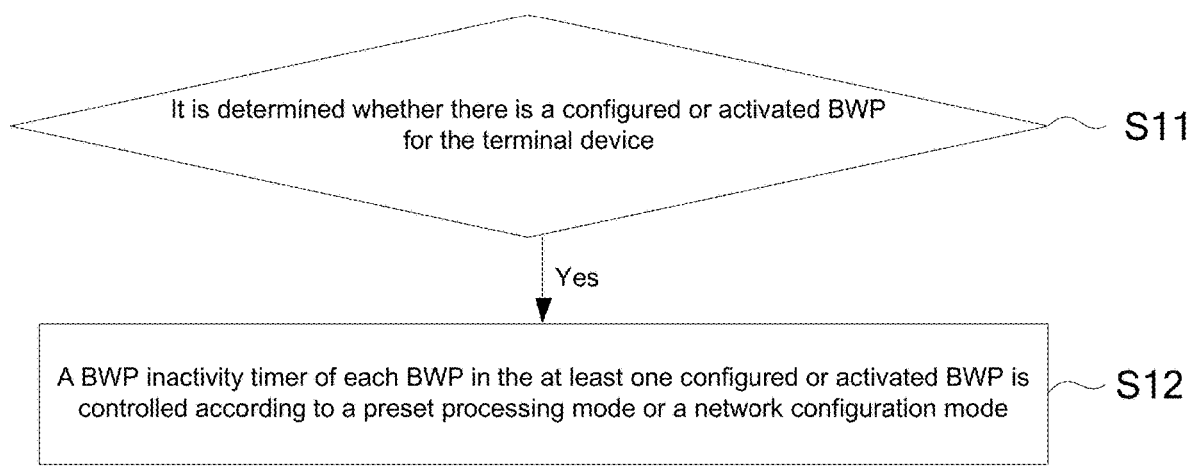
FIG. 2 is a first flowchart showing steps of a method for controlling a BWP deactivation timer, in accordance with some embodiments of the present disclosure.

Some embodiments of the present disclosure provide a method for controlling a BWP inactivity timer. Referring to FIG. 2, the method for controlling the BWP inactivity timer includes S11 and S12.

In the S11, it is determined whether there is a configured or activated BWP for the terminal device.

It will be noted that in a case where there is a configured or activated BWP for the terminal device, the number of configured or activated BWPs may be one or more. For example, the number of configured BWPs is 1, the number of activated BWPs is 1, and then the number of configured or activated BWPs for the terminal device is 2. For another example, the number of configured BWPs is 3, the number of activated BWPs is 3, and then the number of configured or activated BWPs for the terminal device is 6. For yet another example, the number of configured BWPs is 0, the number of activated BWPs is 4, and then the number of configured or activated BWPs in the terminal device is 4.

In addition, the S11 of determining whether there is a configured or activated BWP for the terminal device is performed in a case where a default downlink (DL) BWP is configured for the terminal device, the DL BWP of the terminal device is not an initial downlink BWP, and there are media access control (MAC) protocol data units (PDUs) for the terminal device which are being received on the downlink or transmitted on the uplink through the configured resource.

It will be noted that in the S11, if there is a configured or activated BWP for the terminal device, the following S12 is performed.

In the S12, a BWP inactivity timer of each BWP in the at least one configured or activated BWP is controlled according to a preset processing mode or a network configuration mode.

The preset processing mode or the network configuration mode is to start the BWP inactivity timer, or restart the BWP inactivity timer, or not start the BWP inactivity timer, or stop the BWP inactivity timer.

The network configuration mode is configured by a network-side device. For example, the network configuration mode is configured by a network-side device through RRC signaling.

That "start the BWP inactivity timer" means that a BWP inactivity timer of a certain BWP has not been started, and the BWP inactivity timer of the BWP is controlled to start timing for the first time.

That "restart the BWP inactivity timer" means that a BWP inactivity timer of a certain BWP has been started; but for some reason, the BWP inactivity timer of the BWP is currently in a stopped state; and in this state, the BWP inactivity timer of the BWP is controlled to start, and the timing continues on the last timing result.

That "not start the BWP inactivity timer" means that when a BWP inactivity timer of a certain BWP is in a non-timing state (timing is stopped or has not been started), the BWP inactivity timer of the BWP is controlled to remain in the non-timing state.

That "stop the BWP inactivity timer" means that a BWP inactivity timer of a certain BWP has been started or restarted to be in a timing state, and the BWP inactivity timer is controlled to stop timing while the BWP inactivity timer is in the timing state.

Implementations of S12 in the above some embodiments will be described in detail below.

Figure 3:
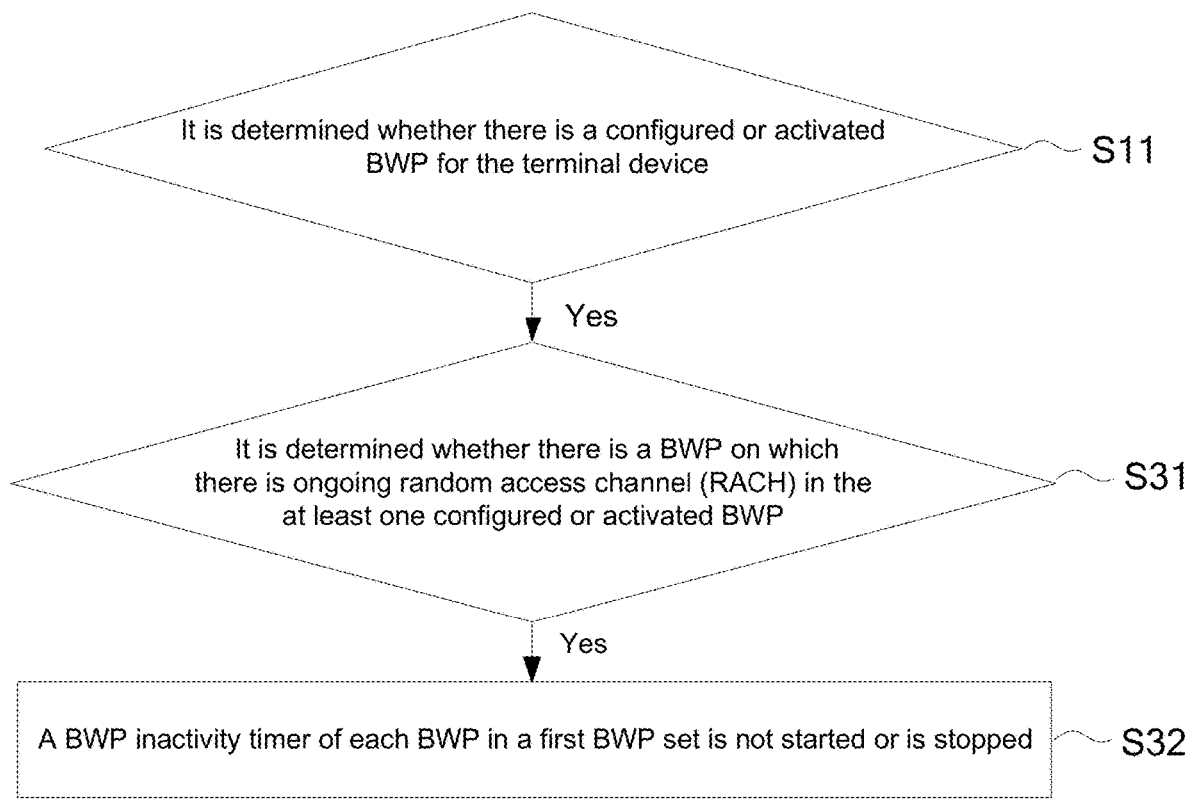
FIG. 3 is a second flowchart showing steps of a method for controlling a BWP deactivation timer, in accordance with some embodiments of the present disclosure.

The first implementation, referring to FIG. 3, the S12 of controlling a BWP inactivity timer of each BWP in the at least one configured or activated BWP according to a preset processing mode or a network configuration mode, includes S31 and S32.

In the S31, it is determined whether there is a BWP on which there is ongoing random access channel (RACH) in the at least one configured or activated BWP.

In the S31, if there is a BWP on which there is ongoing RACH in the at least one configured or activated BWP, the S32 is performed.

In the S32, a BWP inactivity timer of each BWP in a first BWP set is not started or is stopped by the terminal device.

The first BWP set is a BWP set composed of BWP(s) with ongoing RACH in the at least one configured or activated BWP.

That is, BWP inactivity timers of all BWPs with ongoing RACH are controlled to be in the non-timing state.

When a BWP inactivity timer of a BWP with ongoing RACH in the at least one configured or activated BWP is in the timing state, the timer of the BWP is controlled to stop. If a BWP inactivity timer of a BWP with ongoing RACH in the at least one configured or activated BWP is in the non-timing state, the timer of the BWP is controlled not to start.

Figure 4:
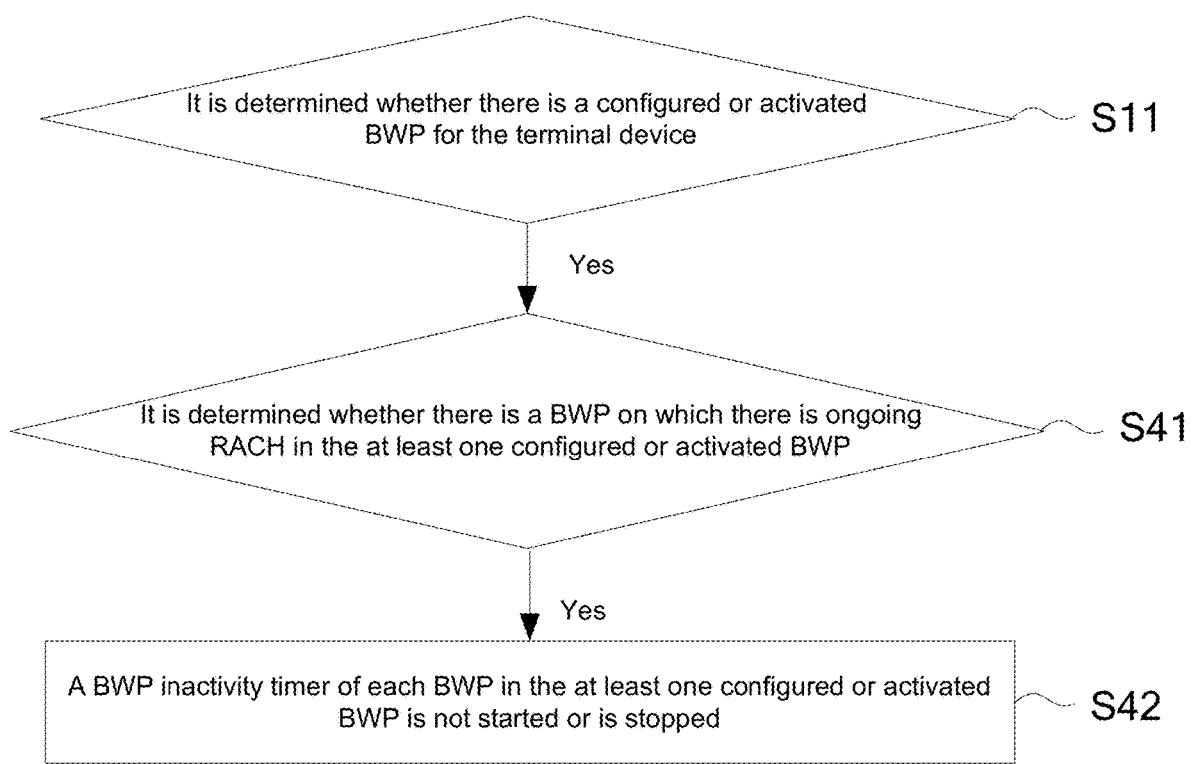
FIG. 4 is a third flowchart showing steps of a method for controlling a BWP inactivity timer, in accordance with some embodiments of the present disclosure.

The second implementation, referring to FIG. 4, the S12 of controlling a BWP inactivity timer of each BWP in the at least one configured or activated BWP according to a preset processing mode or a network configuration mode, includes S41 and S42.

In the S41, it is determined whether there is a BWP on which there is ongoing RACH in the at least one configured or activated BWP.

In the S41, if there is a BWP on which there is ongoing RACH in the at least one configured or activated BWP, the S42 is performed.

In the S42, a BWP inactivity timer of each BWP in the at least one configured or activated BWP is not started or is stopped.

That is, BWP inactivity timers of all activated BWPs for the terminal device are controlled to be in the non-timing state.

When a BWP inactivity timer of a certain BWP in the at least one configured or activated BWP is in the timing state, the timer of the BWP is controlled to stop. If a BWP inactivity timer of a certain BWP in the at least one configured or activated BWP is in the non-timing state, the timer of the BWP is controlled not to start.

Figure 5:
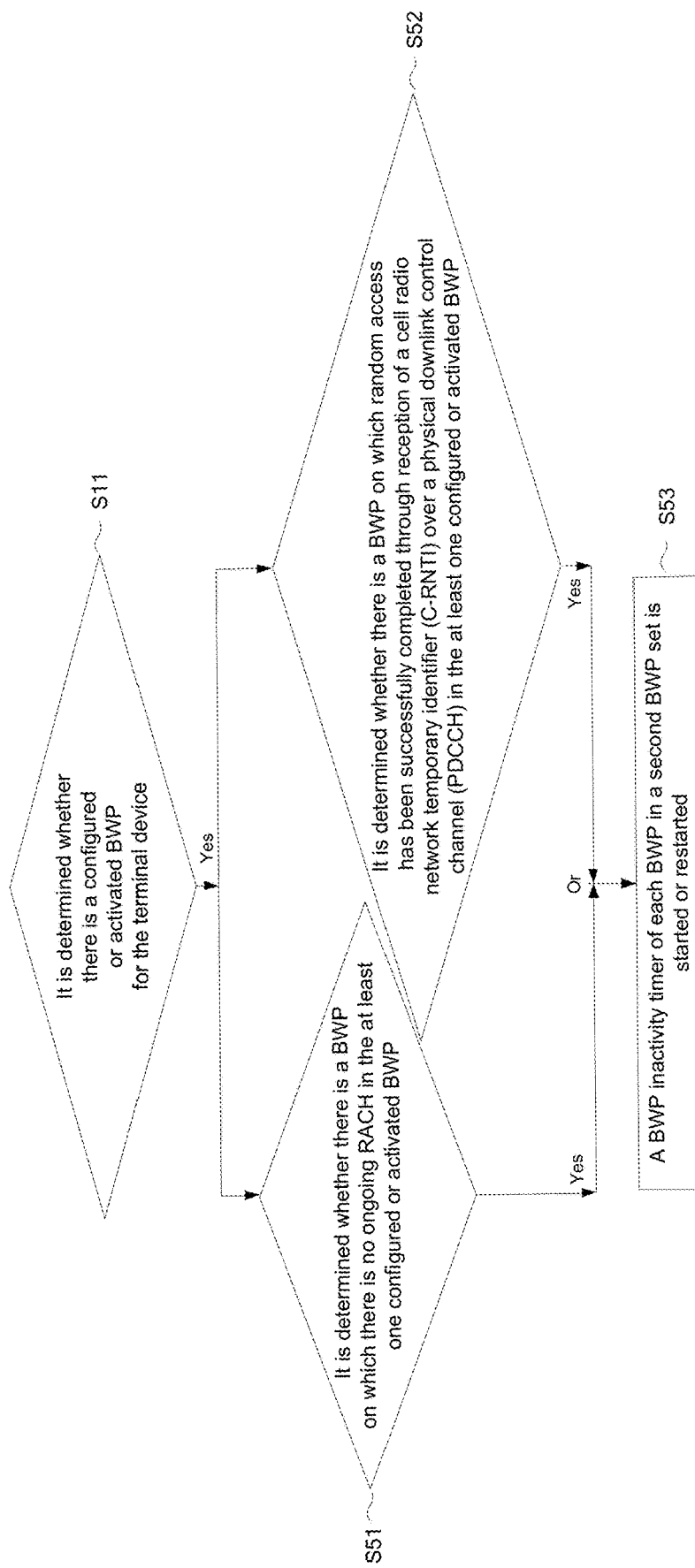
FIG. 5 is a fourth flowchart showing steps of a method for controlling a BWP inactivity timer, in accordance with some embodiments of the present disclosure.

The third implementation, referring to FIG. 5, the S12 of controlling a BWP inactivity timer of each BWP in the at least one configured or activated BWP according to a preset processing mode or a network configuration mode, includes S51 and S52.

In the S51, it is determined whether there is a BWP on which there is no ongoing RACH in the at least one configured or activated BWP.

In the S52, it is determined whether there is a BWP on which random access has been successfully completed through reception of a cell radio network temporary identifier (C-RNTI) over a physical downlink control channel (PDCCH) in the at least one configured or activated BWP.

Similarly, it will be noted that a sequence of performing the S51 and the S52 is limited to the following cases in some embodiments of the present disclosure. The S51 may be performed first, and then the S52 is performed; or the S52 may be performed first, and then the S51 is performed; or the S51 and the S52 may be performed simultaneously.

If there is a BWP on which there is no ongoing RACH in the at least one configured or activated BWP in the S51, or there is a BWP on which random access has been successfully completed through reception of the C-RNTI over the PDCCH in the at least one configured or activated BWP in the S52, the S53 is performed.

In the S53, a BWP inactivity timer of each BWP in a second BWP set is started or restarted.

The second BWP set is a BWP set composed of BWP(s) without ongoing RACH in the at least one configured or activated BWP, and BWP(s) on which random access has been successfully completed through reception of the C-RNTI over the PDCCH in the at least one configured or activated BWP.

Figure 6:
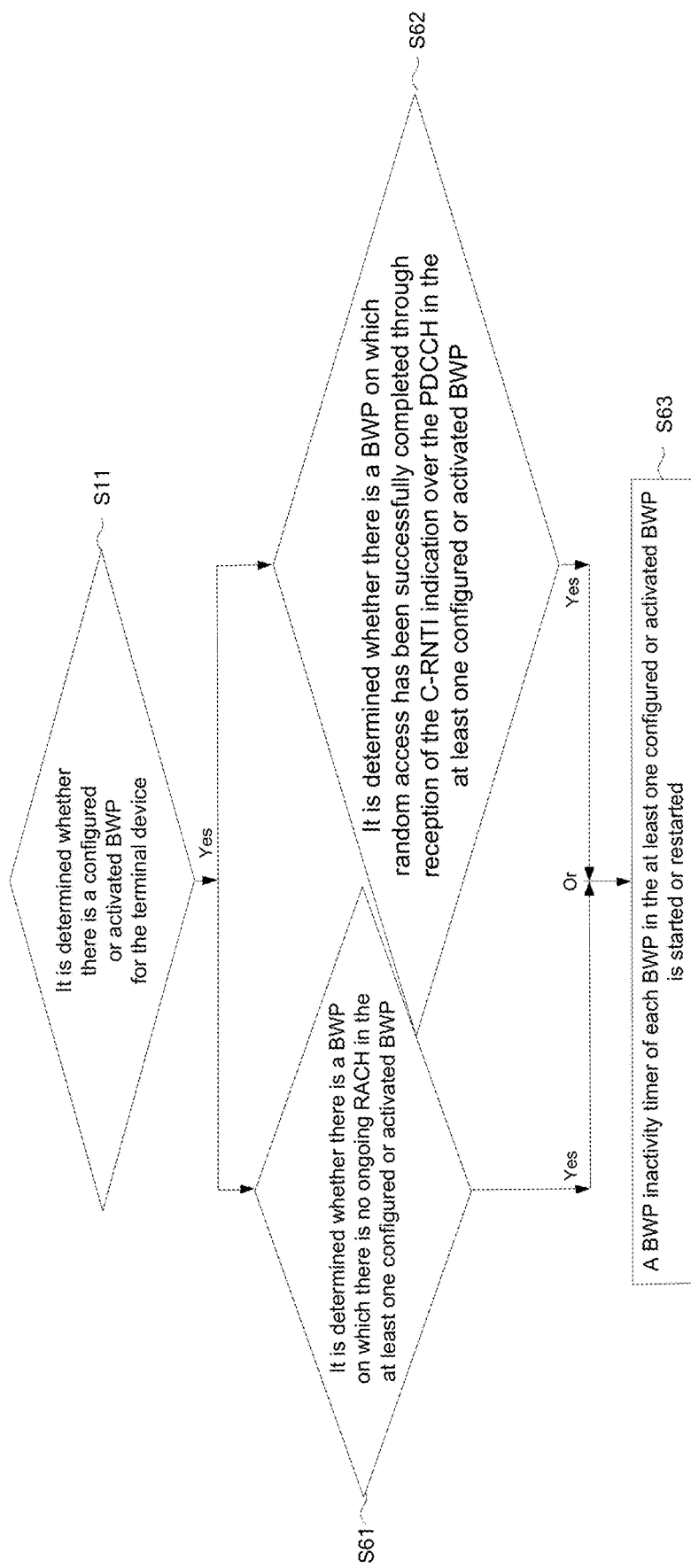
FIG. 6 is a fifth flowchart showing steps of a method for controlling a BWP inactivity timer, in accordance with some embodiments of the present disclosure.

The fourth implementation, referring to FIG. 6, the S12 of controlling a BWP inactivity timer of each BWP in the at least one configured or activated BWP according to a preset processing mode or a network configuration mode, includes S61 to S63.

In the S61, it is determined whether there is a BWP on which there is no ongoing RACH in the at least one configured or activated BWP.

In the S62, it is determined whether there is a BWP on which random access has been successfully completed through reception of the C-RNTI indication over the PDCCH in the at least one configured or activated BWP.

Similarly, it will be noted that a sequence of performing the S61 and the S62 is limited to the following cases in some embodiments of the present disclosure. The S61 may be performed first, and then the S62 is performed; or the S62 may be performed first, and then the S61 is performed; or the S61 and the S62 may be performed simultaneously.

If there is a BWP on which there is no ongoing RACH in the at least one configured or activated BWP in the S61, or there is a BWP on which random access has been successfully completed through reception of the C-RNTI over the PDCCH in the at least one configured or activated BWP in the S62, the S63 is performed.

In the S63, a BWP inactivity timer of each BWP in the at least one configured or activated BWP is started or restarted.

That is, when at least one BWP in the at least one configured or activated BWP does not have ongoing RACH, or random access has been successfully completed on at least one BWP of the at least one configured or activated BWP through reception of the C-RNTI over the PDCCH, a BWP inactivity timer of the at least one configured or activated BWP for the terminal device is started or restarted.

Figure 7:
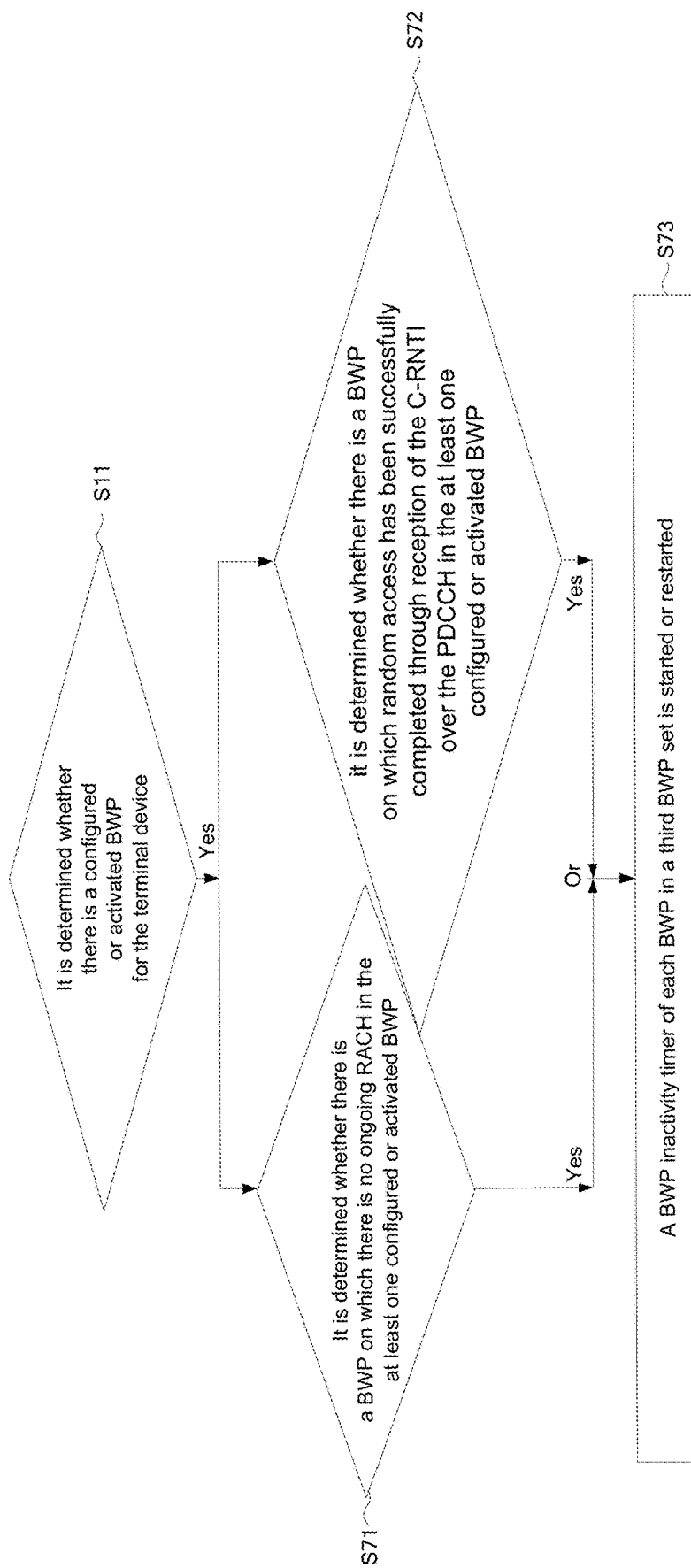
FIG. 7 is a sixth flowchart showing steps of a method for controlling a BWP inactivity timer, in accordance with some embodiments of the present disclosure.

The fifth implementation, referring to FIG. 7, the S12 of controlling a BWP inactivity timer of each BWP in the at least one configured or activated BWP according to a preset processing mode or a network configuration mode, includes S71 to S73.

In the S71, it is determined whether there is a BWP on which there is no ongoing RACH in the at least one configured or activated BWP.

In the S72, it is determined whether there is a BWP on which random access has been successfully completed through reception of the C-RNTI over the PDCCH in the at least one configured or activated BWP.

Similarly, it will be noted that a sequence of performing the S71 and the S72 is limited to following cases in some embodiments of the present disclosure. The S71 may be performed first, and then the S72 is performed; or the S72 may be performed first, and then the S71 is performed; or the S71 and the S72 may be performed simultaneously.

If there is a BWP on which there is no ongoing RACH in the at least one configured or activated BWP in the S71, or there is a BWP on which random access has been successfully completed through reception of the C-RNTI over the PDCCH in the at least one configured or activated BWP in the S72, S73 is performed.

In S73, a BWP inactivity timer of each BWP in a third BWP set is started or restarted.

The third BWP set is a BWP set composed of BWP(s) on which a preamble is sent and BWP(s) on which a random access response is received.

Figure 8:
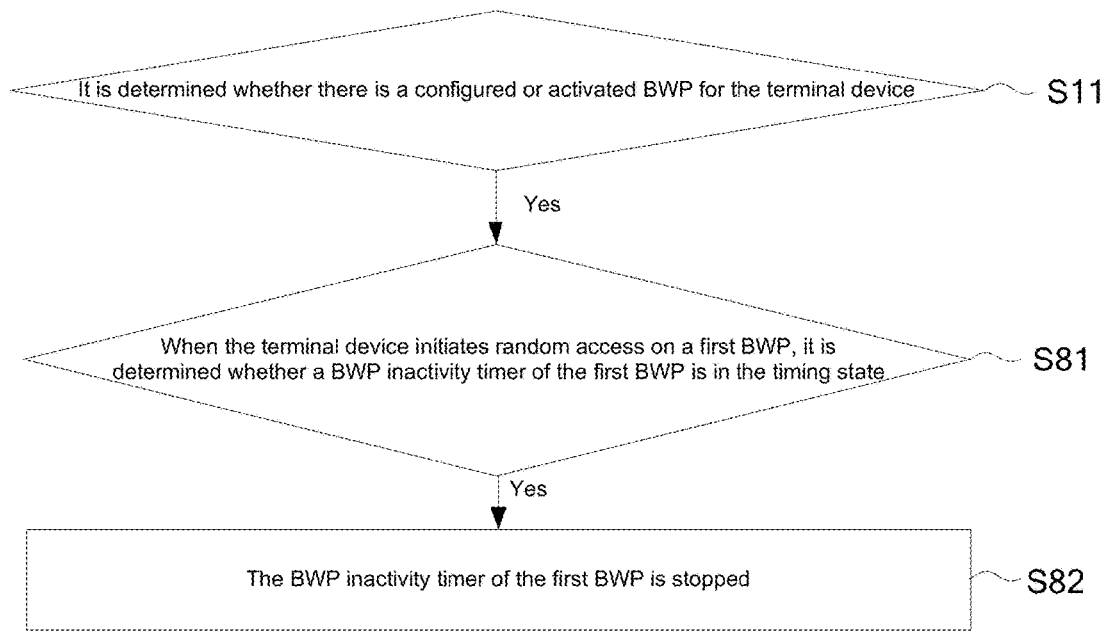
FIG. 8 is a seventh flowchart showing steps of a method for controlling a BWP inactivity timer, in accordance with some embodiments of the present disclosure.

The sixth implementation, referring to FIG. 8, the S12 of controlling a BWP inactivity timer of each BWP in the at least one configured or activated BWP according to a preset processing mode or a network configuration mode, includes S81 and S82.

In the S81, when the terminal device initiates random access on a first BWP, it is determined whether a BWP inactivity timer of the first BWP is in the timing state.

The first BWP is a BWP in the at least one configured or activated BWP. That is, the first BWP is a BWP of the activated BWPs of the terminal device.

That the BWP inactivity timer of the first BWP is in the timing state includes the cases: the BWP inactivity timer of the first BWP has been started and the BWP inactivity timer of the first BWP has been restarted.

In the S81, if the BWP inactivity timer of the first BWP is in the timing state, step S82 is performed. That is, in a case where the BWP inactivity timer of the first BWP has been started or restarted and the terminal device initiates random access in the first BWP, step S62 is performed.

In the S82, the BWP inactivity timer of the first BWP is stopped.

Figure 9:
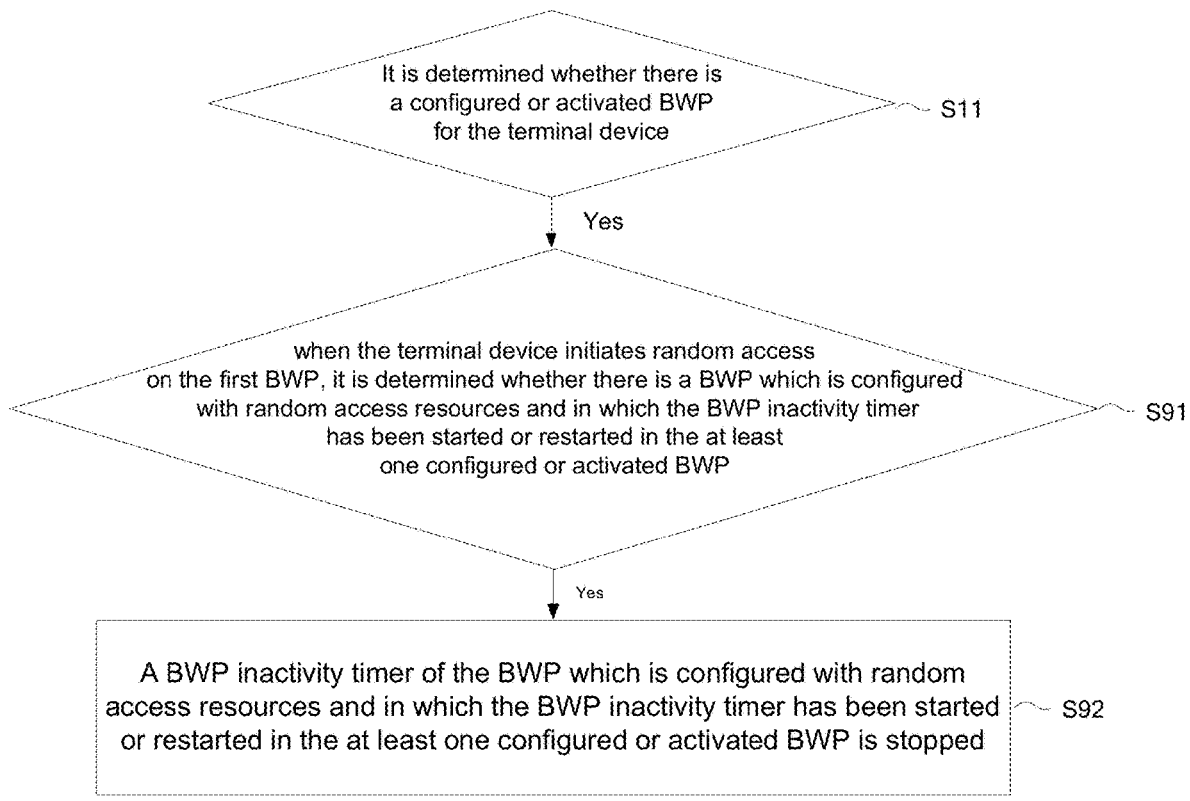
FIG. 9 is an eighth flowchart showing steps of a method for controlling a BWP inactivity timer, in accordance with some embodiments of the present disclosure.

The seventh implementation, referring to FIG. 9, the S12 of controlling a BWP inactivity timer of each BWP in the at least one configured or activated BWP according to a preset processing mode or a network configuration mode, includes S91 and S92.

In the S91, when the terminal device initiates random access on the first BWP, it is determined whether there is a BWP which is configured with random access resources and in which the BWP inactivity timer has been started or restarted in the at least one configured or activated BWP.

The first BWP is a BWP in the at least one configured or activated BWP.

In the S91, if there is a BWP which is configured with random access resources and in which the BWP inactivity timer has been started or restarted in the at least one configured or activated BWP, the S92 is performed. That is, in the S92, a BWP inactivity timer of the BWP which is configured with random access resources and in which the BWP inactivity timer has been started or restarted in the at least one configured or activated BWP is stopped.

Figure 10:
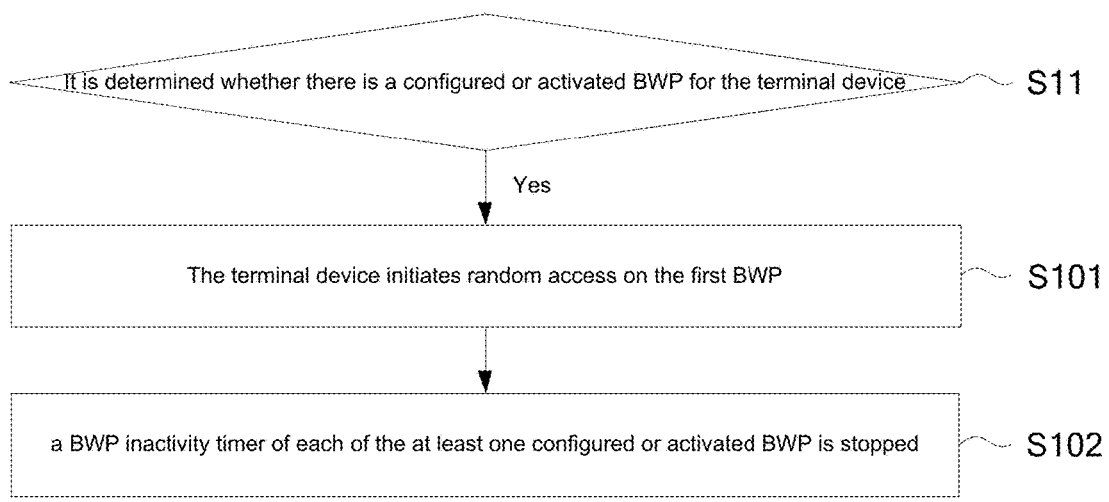
FIG. 10 is a ninth flowchart showing steps of a method for controlling a BWP inactivity timer, in accordance with some embodiments of the present disclosure.

The eighth implementation, referring to FIG. 10, the S12 of controlling a BWP inactivity timer of each BWP in the at least one configured or activated BWP according to a preset processing mode or a network configuration mode, includes S101 and S102.

In the S101, the terminal device initiates random access on the first BWP.

The first BWP is a BWP in the at least one configured or activated BWP.

In the S102, a BWP inactivity timer of each of the at least one configured or activated BWP is stopped.

Figure 11:
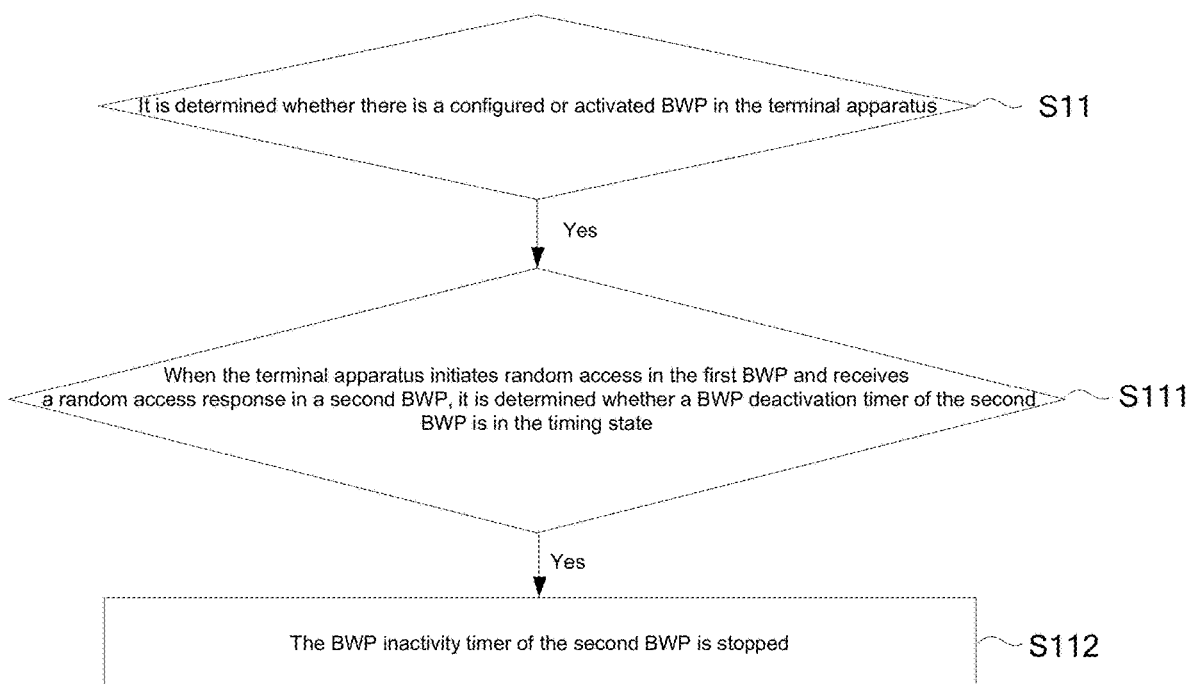
FIG. 11 is a tenth flowchart showing steps of a method for controlling a BWP inactivity timer, in accordance with some embodiments of the present disclosure.

The ninth implementation, referring to FIG. 11, the S12 of controlling a BWP inactivity timer of each BWP in the at least one configured or activated BWP according to a preset processing mode or a network configuration mode, includes S111 and S112.

In S111, when the terminal device initiates random access on the first BWP and receives a random access response on a second BWP, it is determined whether a BWP inactivity timer of the second BWP is in the timing state.

The first BWP and the second BWP are different BWPs.

For example, the first BWP may be a BWP of a secondary cell (SCell) accessed by the terminal device, and the second BWP may be a BWP of a principal secondary cell (PSCell) accessed by the terminal device.

Similarly, that the BWP inactivity timer of the second BWP is in the timing state, includes cases: the BWP inactivity timer of the second BWP has been started and the BWP inactivity timer of the second BWP has been restarted.

In the S111, if the BWP inactivity timer of the second BWP is in the timing state (the BWP inactivity timer of the second BWP has been started or restarted), the S112 is performed.

In S112, the BWP inactivity timer of the second BWP is stopped.

Figure 12:
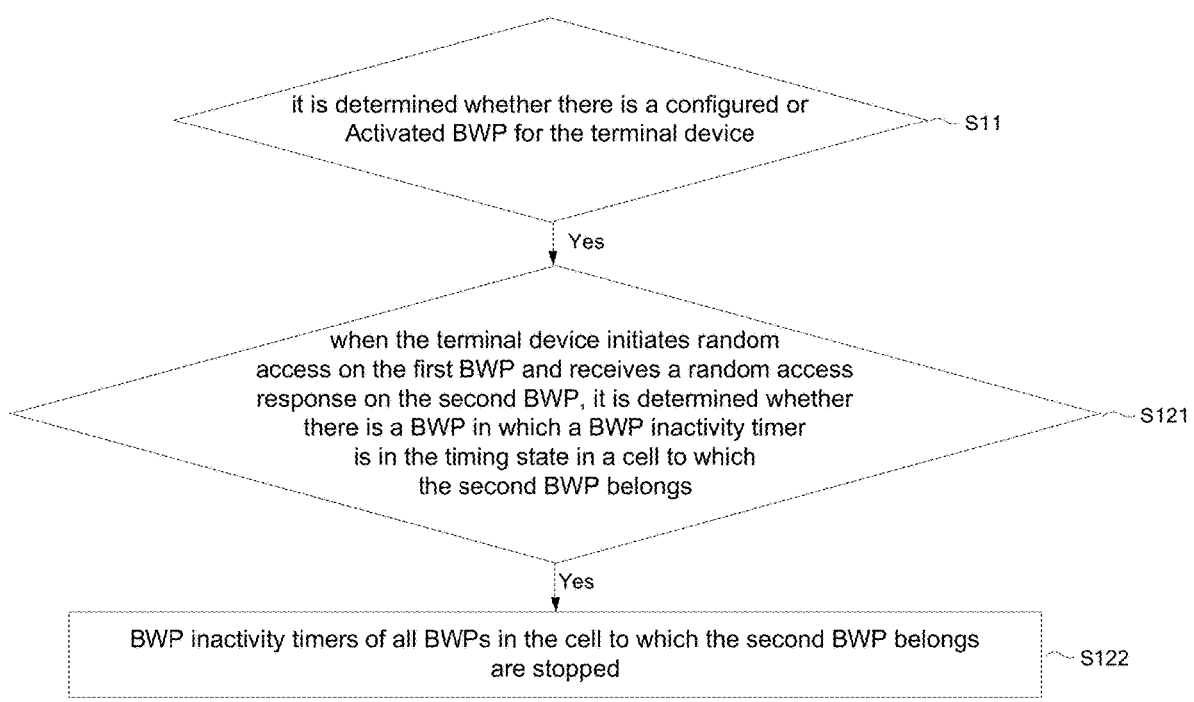
FIG. 12 is an eleventh flowchart showing steps of a method for controlling a BWP inactivity timer, in accordance with some embodiments of the present disclosure.

The tenth implementation, referring to FIG. 12, the S12 of controlling a BWP inactivity timer of each BWP in the at least one configured or activated BWP according to a preset processing mode or a network configuration mode, includes S121 and S122.

In the S121, when the terminal device initiates random access on the first BWP and receives a random access response on the second BWP, it is determined whether there is a BWP in which a BWP inactivity timer is in the timing state in a cell to which the second BWP belongs.

The first BWP and the second BWP are different BWPs.

It will be noted that the first BWP and the second BWP in the above embodiment may be BWPs belonging to a same cell, or may be BWPs belonging to different cells. That is, a cell to which the first BWP belongs may be the same as a cell to which the second BWP belongs, or the cell to which the first BWP belongs may be different from the cell to which the second BWP belongs.

For example, the first BWP may be a BWP in the SCell accessed by the terminal device, and the second BWP may be a BWP in the PSCell accessed by the terminal device.

Similarly, that the BWP inactivity timer of the second BWP is in the timing state includes cases: the BWP inactivity timer of the second BWP has been started and the BWP inactivity timer of the second BWP has been restarted.

In the S111, if there is a BWP in which the BWP inactivity timer is in the timing state in the cell to which the second BWP belongs (there is a BWP in which the BWP inactivity timer has been started or restarted), the S122 is performed.

In the S122, BWP inactivity timers of all BWPs in the cell to which the second BWP belongs are stopped.

Figure 13:
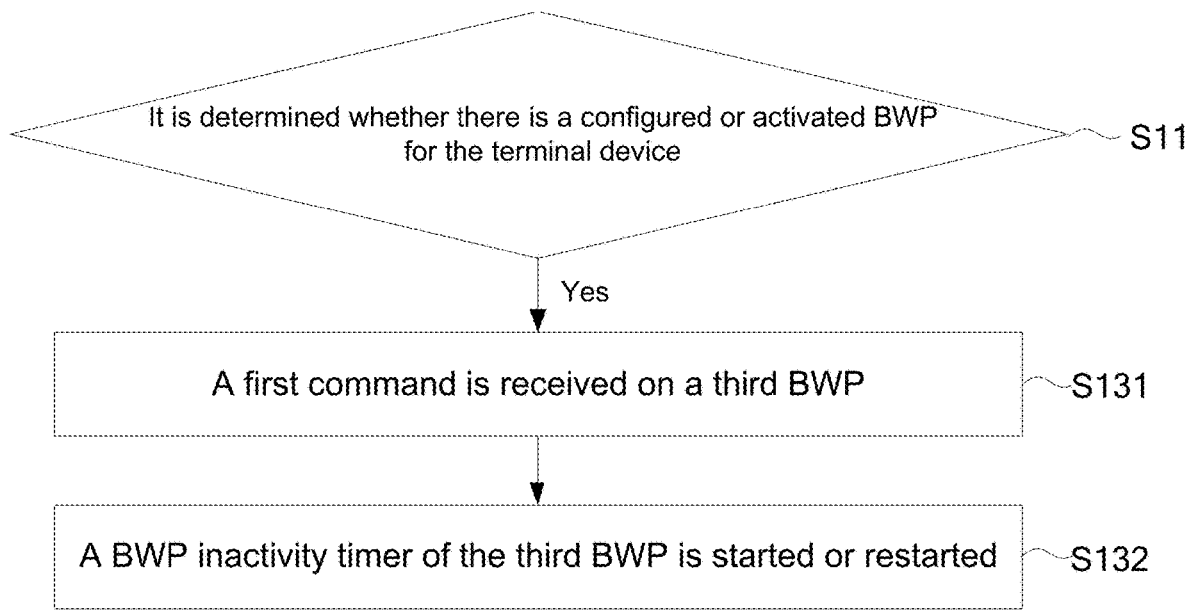
FIG. 13 is a twelfth flowchart showing steps of a method for controlling a BWP inactivity timer, in accordance with some embodiments of the present disclosure.

The eleventh implementation, referring to FIG. 13, the S12 of controlling a BWP inactivity timer of each BWP in the at least one configured or activated BWP according to a preset processing mode or a network configuration mode, includes S131 and S132.

In the S131, a first command is received on a third BWP.

The first command is used to instruct downlink allocation or uplink scheduling for the third BWP and/or a fourth BWP. The third BWP is a BWP in at least one configured or activated BWP, and the fourth BWP is a BWP in at least one configured or activated BWP. The third BWP and the fourth BWP are different BWPs.

That is, it is instructed to perform downlink allocation or uplink scheduling on the third BWP and/or the fourth BWP.

In the S132, a BWP inactivity timer of the third BWP is started or restarted.

That is, when a command for downlink allocation or uplink scheduling across BWPs or cells is received on a BWP, a BWP inactivity timer of the BWP on which the command for downlink allocation or uplink scheduling across BWPs or cells is received is started.

For example, configured or activated BWPs of the terminal device include BWP1, BWP2 and BWP3. When a command for instructing downlink allocation for BWP1, BWP2 and BWP3 is received on BWP1, BWP1 is scheduled by itself, and BWP2 and BWP3 are scheduled by BWP1 across BWPs. Therefore, a BWP inactivity timer of BWP1 is started or restarted.

In addition, in the above the eleventh implementation, in some embodiments of the present disclosure, a state of a BWP inactivity timer of the fourth BWP is not limited, and the BWP inactivity timer of the fourth BWP is not controlled.

In the method for controlling a BWP inactivity timer provided by some embodiments of the present disclosure, in a case where there is at least one configured or activated BWP for the terminal device, a BWP inactivity timer of each BWP in the at least one configured or activated BWP is controlled according to a preset processing mode or a network configuration mode. The preset processing mode or the network configuration mode is to start the BWP inactivity timer, or restart the BWP inactivity timer, or not start the BWP inactivity timer, or stop the BWP inactivity timer. Since some embodiments of the present disclosure provide a method for the terminal device to control a BWP inactivity timer of the at least one configured or activated BWP of the terminal device in a case where there is at least one configured or activated BWP for the terminal device, the BWP inactivity timer of the activated BWP of the terminal device may be controlled.

Figure 14:
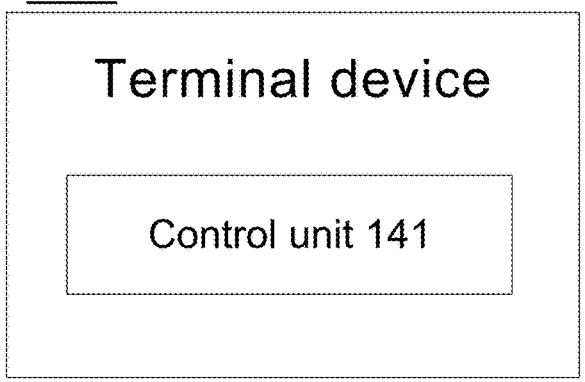
FIG. 14 is a schematic diagram showing a structure of a terminal device, in accordance with some embodiments of the present disclosure.

Some embodiments of the present disclosure provide a terminal device. As shown in FIG. 14, the terminal device 140 includes: a control unit 141, used to control a BWP inactivity timer of each BWP in the at least one configured or activated BWP according to a preset processing mode or a network configuration mode in a case where there is at least one configured or activated bandwidth part (BWP) for the terminal device. The preset processing mode or the network configuration mode is to start the BWP inactivity timer, or restart the BWP inactivity timer, or not start the BWP inactivity timer, or stop the BWP inactivity timer.

In some examples, the control unit 141 is specifically used not to start or stop a BWP inactivity timer of each BWP in the first BWP set in a case where there is at least one BWP on which there is ongoing RACH in the at least one configured or activated BWP. The first BWP set is a BWP set composed of BWP(s) with the ongoing RACH in the at least one configured or activated BWP.

In some examples, the control unit 141 is specifically used not to start or stop a BWP inactivity timer of each BWP in the at least one configured or activated BWP in the case where there is at least one BWP on which there is ongoing RACH in the at least one configured or activated BWP.

In some examples, the control unit 141 is specifically used to start or restart a BWP inactivity timer of each BWP in the second BWP set in a case where there is at least one BWP on which there is no ongoing RACH in the at least one configured or activated BWP, or there is at least one BWP on which random access has been successfully completed through reception of the C-RNTI over the PDCCH in the at least one configured or activated BWP; the second BWP set is a BWP set composed of BWP(s) without ongoing RACH in the at least one configured or activated BWP and BWP(s) on which random access has been successfully completed through reception of the C-RNTI over the PDCCH in the at least one configured or activated BWP.

In some examples, the control unit 141 is specifically used to start or restart a BWP inactivity timer of each BWP in the third BWP set in the case where there is at least one BWP on which there is no ongoing RACH in the at least one configured or activated BWP, or there is at least one BWP on which random access has been successfully completed through reception of the C-RNTI over the PDCCH in the at least one configured or activated BWP; the third BWP set is a BWP set composed of BWP(s) on which a preamble is sent and BWPs on which a random access response is received.

In some examples, the control unit 141 is specifically used to start or restart a BWP inactivity timer of each BWP among the at least one configured or activated BWP in the case where there is at least one BWP on which there is no ongoing RACH in the at least one configured or activated BWP, or there is at least one BWP on which random access has been successfully completed through reception of the C-RNTI over the PDCCH in the at least one configured or activated BWP.

In some examples, the control unit 141 is specifically used to stop the BWP inactivity timer of the first BWP in a case where the BWP inactivity timer of the first BWP has been started or restarted and the terminal device initiates random access on the first BWP; the first BWP is a BWP in the at least one configured or activated BWP.

In some examples, the control unit 141 is specifically used to stop the BWP inactivity timer of the BWP which is configured with random access resources and in which the BWP inactivity timer has been started or restarted in the at least one configured or activated BWP in a case where the terminal device initiates random access on the first BWP; the first BWP is a BWP in the at least one configured or activated BWP.

In some examples, the control unit 141 is specifically used to stop a BWP inactivity timer of each of the at least one configured or activated BWP in the case where the terminal device initiates random access on the first BWP; the first BWP is a BWP among the at least one configured or activated BWP.

In some examples, the control unit 141 is specifically used to stop the BWP inactivity timer of the second BWP in a case where the terminal device initiates random access on the first BWP and receives the random access response on the second BWP, and the BWP inactivity timer of the second BWP has been started or restarted; the first BWP and the second BWP are both BWPs in the at least one configured or activated BWP, and the first BWP and the second BWP are different BWPs.

In some examples, the control unit 141 is specifically used to stop BWP inactivity timers of all BWPs in the cell to which the second BWP belongs in a case where the terminal device initiates random access on the first BWP and receives the random access response on the second BWP; the first BWP and the second BWP are both BWPs in the at least one configured or activated BWP, and the first BWP and the second BWP are different BWPs.

In some examples, the control unit 141 is specifically used to start or restart the BWP inactivity timer of the third BWP in a case where the first command is received on the third BWP; the first command is used to instruct downlink allocation or uplink scheduling for the third BWP and/or the fourth BWP, the third BWP and the fourth BWP are both BWPs in the at least one configured or activated BWP, and the third BWP and the fourth BWP are different BWPs.

In a case where there is at least one configured or activated BWP for the terminal device, the terminal device provided by some embodiments of the present disclosure controls a BWP inactivity timer of each BWP in the at least one configured or activated BWP according to a preset processing mode or a network configuration mode. The preset processing mode or the network configuration mode is to start the BWP inactivity timer, or restart the BWP inactivity timer, or not start the BWP inactivity timer, or stop the BWP inactivity timer. Since some embodiments of the present disclosure provides a method for the terminal device to control a BWP inactivity timer of the at least one configured or activated BWP of the terminal device in a case where there is at least one configured or activated BWP for the terminal device, the BWP inactivity timer of the activated BWP of the terminal device may be controlled.

Figure 15:
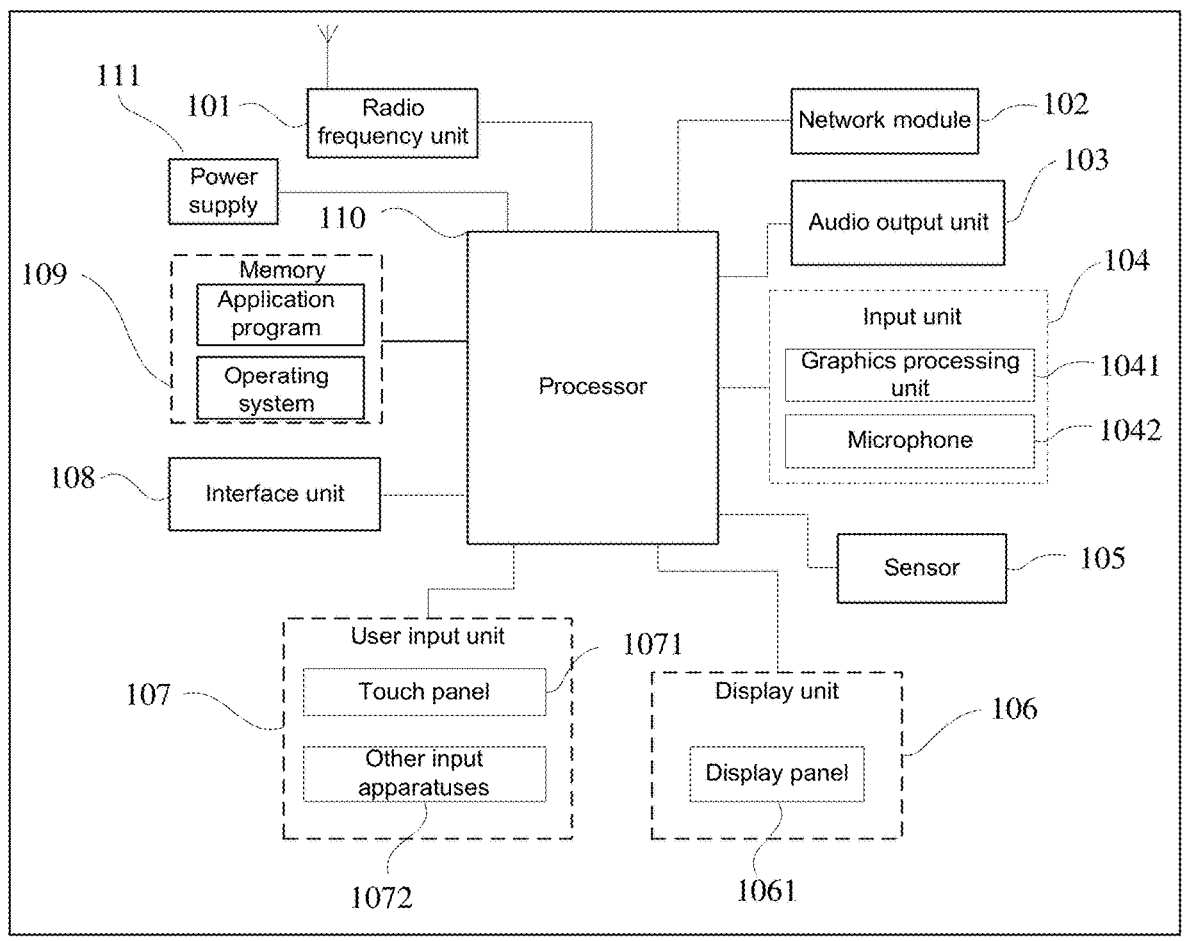
FIG. 15 is a schematic diagram showing a hardware structure of a terminal device, in accordance with some embodiments of the present disclosure.

FIG. 15 is a schematic diagram showing a hardware structure of a terminal device for implementing some embodiments of the present disclosure. The terminal device includes, but is not limited to, a radio frequency unit 101, a network module 102, an audio output unit 103, an input unit 104, a sensor 105, a display unit 106, a user input unit 107, an interface unit 108, a memory 109, a processor 110 and a power supply 111. A person skilled in the art will understand that, the structure of the terminal device shown in FIG. 15 does not constitute limitation on the terminal device, and the terminal device may include more or fewer components than the terminal device shown in FIG. 15, or a combination of certain components, or components with different arrangements. In some embodiments of the present disclosure, the terminal devices include, but are not limited to, a mobile phone, a tablet computer, a notebook computer, a palmtop computer, a vehicle-mounted terminal, a wearable device and a pedometer.

The processor 110 is configured to control a BWP inactivity timer of each BWP in the at least one configured or activated BWP according to a preset processing mode or a network configuration mode in a case where there is at least one configured or activated bandwidth part (BWP) for the terminal device; the preset processing mode or the network configuration mode is to start the BWP inactivity timer, or restart the BWP inactivity timer, or not start the BWP inactivity timer, or stop the BWP inactivity timer.

In a case where there is at least one configured or activated BWP for the terminal device, the terminal device provided by some embodiments of the present disclosure controls a BWP inactivity timer of each BWP in the at least one configured or activated BWP according to a preset processing mode or a network configuration mode. The preset processing mode or the network configuration mode is to start the BWP inactivity timer, or restart the BWP inactivity timer, or not start the BWP inactivity timer, or stop the BWP inactivity timer. Since some embodiments of the present disclosure provides a method for the terminal device to control a BWP inactivity timer of the at least one configured or activated BWP of the terminal device in a case where there is at least one configured or activated BWP for the terminal device, the BWP inactivity timer of the activated BWP of the terminal device may be controlled.

It will be understood that, in some embodiments of the present disclosure, the radio frequency unit 101 may be configured to receive and transmit signals in a process of receiving and sending information or during a call. The radio frequency unit 101 receives downlink data from a base station, and sends the downlink data to the processor 110 for processing. In addition, the radio frequency unit 101 sends uplink data to the base station. Generally, the radio frequency unit 101 includes, but is not limited to, an antenna, at least one amplifier, a transceiver, a coupler, a low noise amplifier and a duplexer. In addition, the radio frequency unit 101 may further communicate with the network and other devices through a wireless communication system.

The terminal device provides wireless broadband Internet access to the user through the network module 102, such as helping the user to send and receive emails, browse web pages, and access streaming media.

The audio output unit 103 may convert audio data received by the radio frequency unit 101 or the network module 102 or stored in the memory 109 into audio signals and output the audio signals as sound. Moreover, the audio output unit 103 may further provide audio output associated with a specific function performed by the terminal device (e.g., call signal reception sound and message reception sound). The audio output unit 103 includes a speaker, a buzzer and a receiver.

The input unit 104 is configured to receive audio signals or video signals. The input unit 104 may include a graphics processing unit (GPU) 1041 and a microphone 1042. The GPU 1041 processes image data of still pictures or videos obtained by an image capture device (e.g., a camera) in a video capture mode or an image capture mode. A processed image frame may be displayed on the display unit 106. The image frame processed by the GPU 1041 may be stored in the memory 109 (or other storage medium) or sent via the radio frequency unit 101 or the network module 102. The microphone 1042 may receive sound, and may process the sound into audio data. The audio data obtained after processing may be converted into a format that may be sent to a mobile communication base station via the radio frequency unit 101 for output in a case of a telephone call mode.

The terminal device further includes at least one type of sensor 105, such as a light sensor, a motion sensor, and any other sensor. The light sensor includes an ambient light sensor and a proximity sensor. The ambient light sensor may adjust brightness of a display panel 1061 according to brightness of the ambient light. The proximity sensor may turn off the display panel 1061 and/or backlight when the terminal device is moved to an ear. As a type of the motion sensor, an accelerometer sensor may detect a magnitude of acceleration in a plurality of directions (generally three axes), and may detect a magnitude and a direction of gravity when the accelerometer sensor is static, and may be used to identify postures of the terminal device (e.g., horizontal-vertical screen switching, related games, and magnetometer posture calibration), and identify related functions (e.g., pedometer and knocking) through vibration. The sensor 105 may further include a fingerprint sensor, a pressure sensor, an iris sensor, a molecular sensor, a gyroscope, a barometer, a hygrometer, a thermometer and an infrared sensor, which will not be repeated herein.

The display unit 106 is configured to display information input by the user or information provided to the user. The display unit 106 may include the display panel 1061, which may be configured in a form of a liquid crystal display (LCD), an organic light-emitting diode (OLED), or the like.

The user input unit 107 may be configured to receive input digital or character information and generate key signal input related to user settings and function control of the terminal device. The user input unit 107 includes a touch panel 1071 and other input devices 1072. The touch panel 1071, also referred to as a touch screen, may collect touch operation by the user on or near the touch panel 1071 (e.g., operation by the user on or near the touch panel 1071 by using any suitable object or attachment such as a finger and a stylus). The touch panel 1071 may include two portions, i.e., a touch detection device and a touch controller. The touch detection device detects a position touched by the user, detects a signal brought by the touch operation and transmits the signal to the touch controller. The touch controller receives touch information from the touch detection device, converts the touch information into coordinates of a touch point, sends the coordinates of the touch point to the processor 110, receives a command from the processor 110, and executes the command. In addition, the touch panel 1071 may be achieved by using various types of touch panels such as a resistive touch panel, a capacitive touch panel, an infrared touch panel, and a surface acoustic wave touch panel. In addition to the touch panel 1071, the user input unit 107 may further include the other input devices 1072. The other input devices 1072 may include, but are not limited to, a physical keyboard, function keys (e.g., volume control keys and switch keys), a trackball, a mouse, a joystick, which will not be repeated herein.

The touch panel 1071 may cover the display panel 1061. The touch panel 1071 sends the touch operation on or near it to the processor 110 after detecting the touch operation on or near it, so as to determine a type of the touch event. Then, the processor 110 provides corresponding visual output on the display panel 1061 according to the type of the touch event. Although the touch panel 1071 and the display panel 1061 are used as two separate components to implement an input function and an output function of the terminal device in FIG. 15, in some embodiments, the touch panel 1071 may be integrated with the display panel 1061 to implement the input function and the output function of the terminal device, which is not specifically limited herein.

The interface unit 108 is an interface for connecting an external device and the terminal device. For example, the external device may include a wired or wireless headset port, an external power supply (or battery charger) port, a wired or wireless data port, a memory card port, a port for connecting a device with an identification module, an audio input/output (I/O) port, a video I/O port, and an earphone port. The interface unit 108 may be configured to receive input from the external device (e.g., data information and power) and transmit the received input to one or more elements in the terminal device, or may be configured to transmit data between the terminal device and the external device.

The memory 109 may be configured to store software programs and various data. The memory 109 may mainly include a program storage region and a data storage region.

The program storage region may store an operating system, and an application program required by at least one function (e.g., a sound playing function or an image playing function). The data storage region may store data (e.g., audio data and a phone book) created according to use of a mobile phone. In addition, the memory 109 may include a high-speed random access memory, and may further include a non-volatile memory, such as at least one magnetic disk storage device, a flash memory device, or other volatile solid-state storage devices.

The processor 110 is a control center of the terminal device. The processor 110 is connected to a plurality of parts of an entire terminal device through various interfaces and wirings, and performs various functions of the terminal device and processes data by running or executing software programs and/or modules stored in the memory 109 and invoking data stored in the memory 109, thereby monitoring the terminal device as a whole. The processor 110 may include one or more processing units. An application processor and a modem processor may be integrated into the processor 110. The application processor mainly processes the operating system, a user interface and application programs, and the modem processor mainly processes wireless communication. It will be understood that, the modem processor may not be integrated into the processor 110.

The terminal device may further include the power supply 111 (e.g., a battery) for supplying power to a plurality of components. The power supply 111 may be logically connected to the processor 110 through a power management system, so that functions such as charging management, discharging management, and power consumption management are achieved through the power management system.

In addition, the terminal device includes some functional modules that are not shown, which will not be repeated herein.

Some embodiments of the present disclosure further provides a non-transitory computer-readable storage medium having storing therein computer programs that, when executed by a processor, implement a plurality of processes of the method for controlling a BWP inactivity timer described in the above embodiments, which can achieve the same technical effects. In order to avoid repetition, details will not be repeated herein. The non-transitory computer-readable storage medium may be, for example, a read-only memory (ROM), a random access memory (RAM), a magnetic disk, or an optical disk.

It will be noted that, the terms such as "comprise" and "include" or any other variants thereof herein are intended to cover non-exclusive inclusion, so that a process, a method, an article or a device that includes a series of elements not only includes those elements, but also includes other elements not explicitly listed, or includes elements inherent to the process, the method, the article or the device. In a case where there is no more limitation, an element defined by the phrase "including a . . . " does not exclude existence of other identical elements in a process, a method, an article or a device that includes the element.

Through the description of the above embodiments, a person skilled in the art will clearly understand that, the method in the above embodiments may be performed by means of software plus a necessary general-purpose hardware platform. Of course, the method may further be performed through hardware, but in many cases, the former is a better implementation. On a basis of such understanding, the technical solution in the present disclosure essentially or a part contributing to the prior art may be embodied in a form of a software product. The computer software product is stored in a storage medium (e.g., a ROM/RAM, a diskette, or an optical disk), and includes some instructions for causing a terminal (which may be a mobile phone, a computer, a server, an air conditioner, or a network side device) to perform the method described in a plurality of embodiments of the present disclosure.

The embodiments of the present disclosure are described above with reference to the accompanying drawings. However, the present disclosure is not limited to the above specific embodiments. The above specific embodiments are merely examples and are not restrictive. Under enlightenment of the present disclosure, a person of ordinary skill in the art may make a plurality of forms without departing from spirit of the present disclosure and the protection scope of the claims, all of which fall within the protection scope of the present disclosure.

What is claimed is:

1. A method for controlling a BWP inactivity timer, performed by a terminal device, the method comprising:
   in a case where there are multiple activated bandwidth parts (BWPs) for the terminal device, controlling a BWP inactivity timer of each BWP in the multiple activated BWPs according to a preset processing mode or a network configuration mode, wherein
   the preset processing mode or the network configuration mode is to start the BWP inactivity timer, or restart the BWP inactivity timer, or not start the BWP inactivity timer, or stop the BWP inactivity timer;
   wherein controlling the BWP inactivity timer of each BWP in the multiple activated BWPs according to the preset processing mode or the network configuration mode, includes:
   in a case where the terminal device initiates random access on a first BWP and receives a random access response on a second BWP, and the BWP inactivity timer of the second BWP has been started or restarted, stopping the BWP inactivity timer of the second BWP; or
   in a case where the terminal device initiates random access on the first BWP and receives a random access response on the second BWP, stopping the BWP inactivity timers of all BWPs in a cell to which the second BWP belongs; wherein
   the first BWP and the second BWP are BWPs in the multiple activated BWPs, and the first BWP and the second BWP are different BWPs.

2. The method according to claim 1, wherein controlling a BWP inactivity timer of each BWP in the multiple activated BWPs according to the preset processing mode or the network configuration mode, includes:
   in a case where there is at least one BWP on which there is ongoing random access channel in the multiple activated BWPs, not starting or stopping a BWP inactivity timer of each BWP in a first BWP set, wherein
   the first BWP set is a BWP set composed of at least one BWP with the ongoing random access channel in the multiple activated BWPs.

3. The method according to claim 1, wherein that controlling a BWP inactivity timer of each BWP in the multiple activated BWPs according to the preset processing mode or the network configuration mode, includes:
   in a case where there is at least one BWP on which there is ongoing random access channel in the multiple activated BWPs, not starting or stopping a BWP inactivity timer of each BWP in the multiple activated BWPs.

4. The method according to claim 1, wherein controlling a BWP inactivity timer of each BWP in the multiple activated BWPs according to the preset processing mode or the network configuration mode, includes:
in a case where there is at least one BWP on which there is no ongoing random access channel in the multiple activated BWPs or there is at least one BWP on which random access has been successfully completed through reception of a cell radio network temporary identifier (C-RNTI) over a physical downlink control channel (PDCCH) in the multiple activated BWPs, starting or restarting a BWP inactivity timer of each BWP in a second BWP set; wherein
the second BWP set is a BWP set composed of at least one BWP without the ongoing random access channel in the multiple activated BWPs, and at least one BWP on which random access has been successfully completed through reception of the C-RNTI over the PDCCH in the multiple activated BWPs.

5. The method according to claim 1, wherein controlling a BWP inactivity timer of each BWP in the multiple activated BWPs according to the preset processing mode or the network configuration mode, includes:
in a case where there is at least one BWP on which there is no ongoing random access channel in the multiple activated BWPs, or there is at least one BWP on which random access has been successfully completed through reception of a cell radio network temporary identifier (C-RNTI) over a physical downlink control channel (PDCCH), starting or restarting a BWP inactivity timer of each BWP in a third BWP set; wherein
the third BWP set is a BWP set composed of at least one BWP on which a preamble is sent and at least one BWP on which a random access response is received.

6. The method according to claim 1, wherein controlling a BWP inactivity timer of each BWP in the multiple activated BWPs according to the preset processing mode or the network configuration mode, includes:
in a case where there is at least one BWP on which there is no ongoing random access channel in the multiple activated BWPs or there is at least one BWP on which random access has been successfully completed through reception of a cell radio network temporary identifier (C-RNTI) over a physical downlink control channel (PDCCH), starting or restarting a BWP inactivity timer of each BWP in the multiple activated BWPs.

7. The method according to claim 1, wherein controlling a BWP inactivity timer of each BWP in the multiple activated BWPs according to the preset processing mode or the network configuration mode, includes:
in a case where a BWP inactivity timer of a first BWP has been started or restarted and the terminal device initiates random access on the first BWP, stopping the BWP inactivity timer of the first BWP; and
the first BWP is a BWP in the multiple activated BWPs.

8. The method according to claim 1, wherein controlling a BWP inactivity timer of each BWP in the multiple activated BWPs according to the preset processing mode or the network configuration mode, includes:
in a case where the terminal device initiates random access on a first BWP, stopping a BWP inactivity timer of a BWP which is configured with random access resources and in which the BWP inactivity timer has been started or restarted in the multiple activated BWPs; wherein
the first BWP is a BWP in the multiple activated BWPs.

9. The method according to claim 1, wherein controlling a BWP inactivity timer of each BWP in the multiple activated BWPs according to the preset processing mode or the network configuration mode, includes:
In a case where the terminal device initiates random access on a first BWP, stopping a BWP inactivity timer of each of the multiple activated BWPs; wherein
the first BWP is a BWP in the multiple activated BWPs.

10. The method according to claim 1, wherein controlling a BWP inactivity timer of each BWP in the multiple activated BWPs according to the preset processing mode or the network configuration mode, includes:
in a case where a first command is received on a third BWP, starting or restarting a BWP inactivity timer of the third BWP; wherein
the first command is used to instruct downlink allocation or uplink scheduling for the third BWP and/or a fourth BWP, and the third BWP and the fourth BWP are BWPs in the multiple activated BWPs, and the third BWP and the fourth BWP are different BWPs.

11. A terminal device, comprising:
a processor configured to control, in a case where there are multiple activated bandwidth parts (BWPs) for the terminal device, a BWP inactivity timer of each BWP in the multiple activated BWPs according to a preset processing mode or a network configuration mode, wherein
the preset processing mode or the network configuration mode is to start the BWP inactivity timer, or restart the BWP inactivity timer, or not start the BWP inactivity timer, or stop the BWP inactivity timer;
wherein the processor is configured to stop the BWP inactivity timer of a second BWP in a case where the terminal device initiates random access on a first BWP and receives a random access response on the second BWP, and the BWP inactivity timer of the second BWP has been started or restarted; or
the processor is configured to stop BWP inactivity timers of all BWPs in a cell to which a second BWP belongs in a case where the terminal device initiates random access on the first BWP and receives a random access response on the second BWP; wherein
the first BWP and the second BWP are BWPs in the multiple activated BWPs, and the first BWP and the second BWP are different BWPs.

12. The terminal device according to claim 11, wherein
the processor is configured not to start or stop a BWP inactivity timer of each BWP in a first BWP set in a case where there is at least one BWP on which there is ongoing random access channel in the multiple activated BWPs; and
the first BWP set is a BWP set composed of at least one BWP with the ongoing random access channel in the multiple activated BWPs.

13. The terminal device according to claim 11, wherein
the processor is configured not to start or stop a BWP inactivity timer of each BWP in the multiple activated BWPs in a case where there is at least one BWP on which there is ongoing random access channel in the multiple activated BWPs.

14. The terminal device according to claim 11, wherein
the processor is configured to start or restart a BWP inactivity timer of each BWP in a second BWP set in a case where there is at least one BWP on which there is no ongoing random access channel in the multiple activated BWPs, or there is at least one BWP on which random access has been successfully completed through reception of a cell radio network temporary identifier (C-RNTI) over a physical downlink control channel (PDCCH) in the multiple activated BWPs; and the second BWP set is a BWP set composed of at least one BWP without the ongoing random access channel in the multiple activated BWPs, and at least one BWP on which random access has been successfully completed through reception of the C-RNTI over the PDCCH in the multiple activated BWPs.

15. The terminal device according to claim 11, wherein the processor is configured to start or restart a BWP inactivity timer of each BWP in a third BWP set in a case where there is at least one BWP on which there is no ongoing random access channel in the multiple activated BWPs, or there is at least one BWP on which random access has been successfully completed through reception of a cell radio network temporary identifier (C-RNTI) over a physical downlink control channel (PDCCH); and the third BWP set is a BWP set composed of at least one BWP on which a preamble is sent and at least one BWP on which a random access response is received.

16. The terminal device according to claim 11, wherein the processor is configured to start or restart a BWP inactivity timer of each BWP in the multiple activated BWPs in a case where there is at least one BWP on which there is no ongoing random access channel in the multiple activated BWPs, or there is at least one BWP on which random access has been successfully completed through reception of a cell radio network temporary identifier (C-RNTI) over a physical downlink control channel (PDCCH).

17. The terminal device according to claim 11, wherein the processor is configured to stop, in a case where a BWP inactivity timer of a first BWP has been started or restarted and the terminal device initiates random access on the first BWP, the BWP inactivity timer of the first BWP; and the first BWP is a BWP in the multiple activated BWPs.

18. A non-transitory computer-readable storage medium, wherein the non-transitory computer-readable storage medium stores a program that, when executed by a processor, implements:

in a case where there are multiple activated bandwidth parts (BWPs) for the terminal device, controlling a BWP inactivity timer of each BWP in the multiple activated BWPs according to a preset processing mode or a network configuration mode, wherein the preset processing mode or the network configuration mode is to start the BWP inactivity timer, or restart the BWP inactivity timer, or not start the BWP inactivity timer, or stop the BWP inactivity timer;

wherein the non-transitory computer-readable storage medium, when executed by the processor, implements:

in a case where the terminal device initiates random access on a first BWP and receives a random access response on a second BWP, and the BWP inactivity timer of the second BWP has been started or restarted, stopping the BWP inactivity timer of the second BWP; or in a case where the terminal device initiates random access on the first BWP and receives a random access response on the second BWP, stopping BWP inactivity timers of all BWPs in a cell to which the second BWP belongs; wherein the first BWP and the second BWP are BWPs in the multiple activated BWPs, and the first BWP and the second BWP are different BWPs.

19. The non-transitory computer-readable storage medium according to claim 18, wherein the program, when executed by the processor, implements:

in a case where there is at least one BWP on which there is ongoing random access channel in the multiple activated BWPs, not starting or stopping the BWP inactivity timer of each BWP in a first BWP set, wherein the first BWP set is a BWP set composed of at least one BWP with the ongoing random access channel in the multiple activated BWPs.

20. The non-transitory computer-readable storage medium according to claim 18, wherein the program, when executed by the processor, implements:

in a case where there is at least one BWP on which there is ongoing random access channel in the multiple activated BWPs, not starting or stopping a BWP inactivity timer of each BWP in the multiple activated BWPs.

* * * * *